United States Patent [19]

Easton

[11] 4,143,928
[45] Mar. 13, 1979

[54] ANIMAL PRODUCTION CYCLE PROGRAMMER

[76] Inventor: Harlan J. Easton, R.R. 3, Blooming Prairie, Minn. 55917

[21] Appl. No.: 854,666

[22] Filed: Nov. 25, 1977

[51] Int. Cl.² .............................................. A47B 63/00
[52] U.S. Cl. ................................... 312/197; 312/186; 312/234.1; 312/252
[58] Field of Search ...................... 312/197, 234.1, 305, 312/183, 186, 252, 290

[56] References Cited

U.S. PATENT DOCUMENTS

| | | | |
|---|---|---|---|
| 562,352 | 6/1896 | Boniface | 312/197 |
| 981,959 | 1/1911 | Weaver et al. | 312/305 |
| 2,496,490 | 2/1950 | Phillips | 312/252 |
| 2,711,741 | 6/1955 | Wassell | 312/183 |
| 2,897,031 | 7/1959 | Frost | 312/183 |
| 3,221,890 | 12/1965 | Wassell | 312/183 |
| 3,383,147 | 5/1968 | Proulx et al. | 312/197 |
| 3,876,269 | 4/1975 | Fisher et al. | 312/234.1 |
| 3,994,548 | 11/1976 | Lindvall et al. | 312/197 |

*Primary Examiner*—Victor N. Sakran
*Attorney, Agent, or Firm*—Nickolas E. Westman

[57] ABSTRACT

A programming device for maintaining a cyclic program and associated records for such program in the production cycle of animals. In particular, the device relates to a carousel type record programmer for keeping records and maintaining set programs for use in swine production. The records for each animal are maintained on a card or cards filed in a fixed radially extending slot in a carousel housing, and the program is carried on a ring which rotates relative to the card file slots and which ring is advanced one day at a time so that each day a program space aligns with a particular card file slot. Any program item to be performed for the animals or subjects whose cards are located in the aligning slot will be carried out. That is, the animals whose cards align with the program will be subjected to the treatment, or other operation that is required.

9 Claims, 8 Drawing Figures

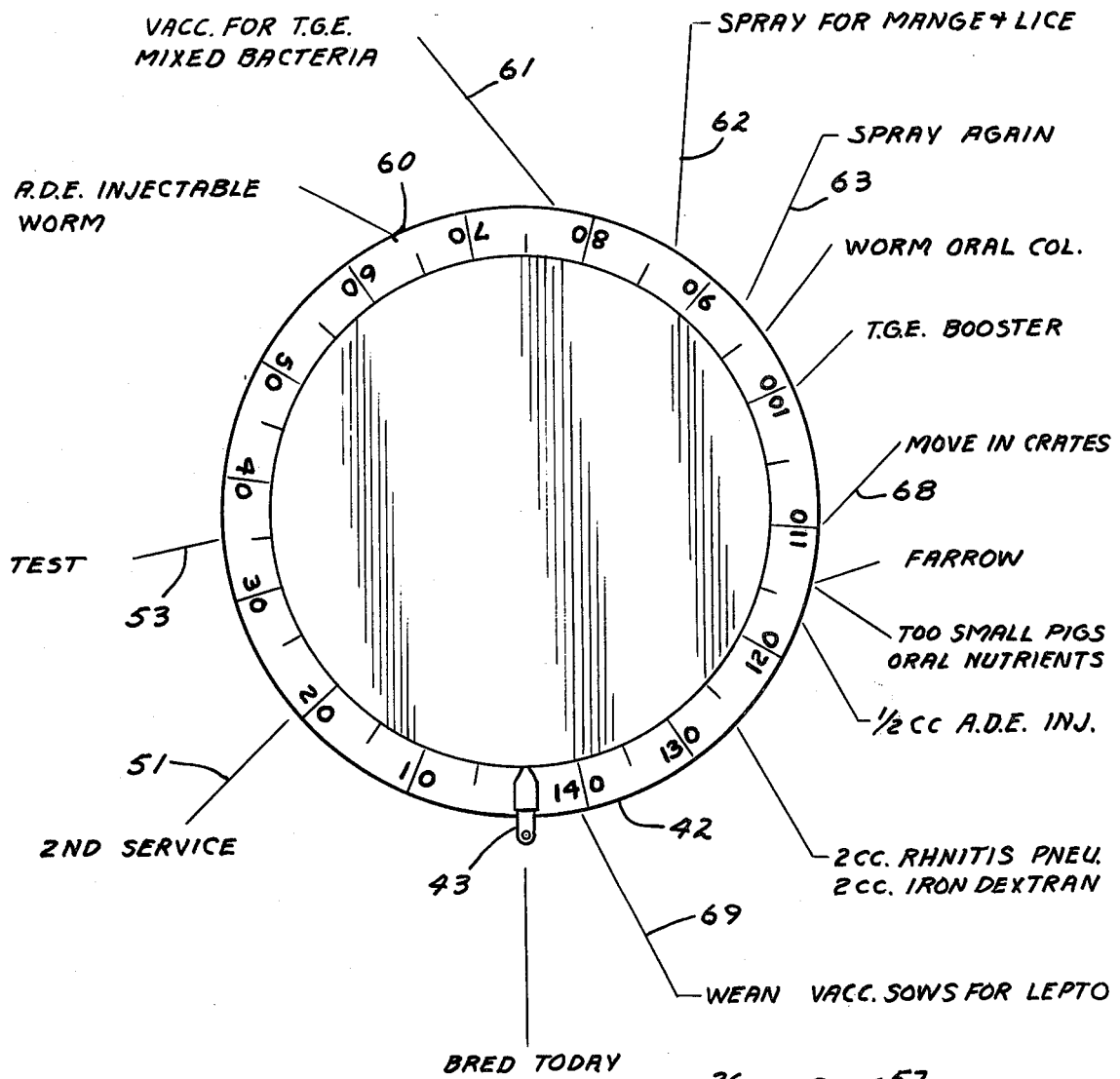
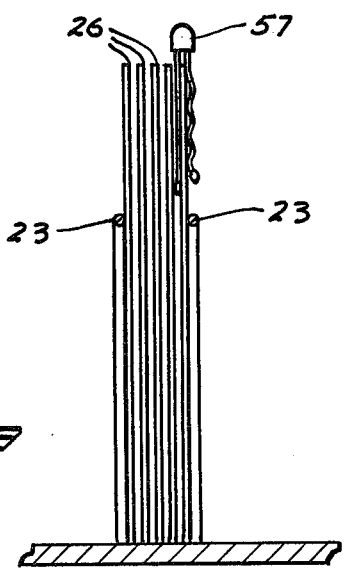
FIG. 7
FIG. 8

ANIMAL PRODUCTION CYCLE PROGRAMMER

BACKGROUND OF THE INVENTION

1. Field of the Invention

The present invention relates to a animal production cycle programmer which permits the keeping of records for individual animals and programming treatment, care and feeding operations in connection with an animal or other subject during a set production cycle.

2. Prior Art

In the prior art various programmers have been utilized for keeping records and programming animal production on a routine basis. For example, U.S. Pat. No. 3,994,548 relates to a swine carousel, wherein the individual record card for each of the animals in the program is mounted in a housing which rotates relative to a fixed program carrying board. The device does not separately indicate on what particular date or month the program items occur. The assembly that rotates is relatively large and carries all of the cards for all of the animals in the program. The support for the animal cards if rotatably mounted relative to the fixed support and there is no apparent immediate direct visual clue to indicate whether or not the rotatable device has been rotated for a particular day in the cycle.

Additional devices for permitting circular filing are cited in the references included in U.S. Pat. No. 3,994,548.

SUMMARY OF THE INVENTION

The present invention relates to a programmer for programming a cycle of operation, in particular as shown, the production cycle of animals. The invention further relates to the use of a rotary type programmer where records of treatment care, or other occurrences for each of the individual days of each of the months must be maintained, and wherein particular animals or other subjects or items should receive a certain, known cyclic maintenance routine.

The device is designed primarily for use in connection with animals such as swine where each individual animal is subjected to a routine cycle such as the reproduction cycle of a sow from the time of breeding to weaning of the litter.

The programmer includes means for individually, and separately keeping file cards on each animal or subject located in radially extending file slots of a fixed card support. Adjacent the outer edges of the card support there are adjustable (re-settable) rings which provide information indicating the month and the day of the month, and also a rotating ring correlated to the month and day rings which contains the program cycle so it can be visually identified (as shown). The program is a program of treatment and care which is selected by the operator and can be varied for different animals, but which contains a routine cycle for typical animals, and or for groups of animals, whose record cards are kept in the center portions of the programmer. The groups of animals for each program can be identified by coding, such as color code or indicia.

The program is set up as desired, and the program ring is then advanced for each day during each month or other time period. The particular chore or treatment to be performed on a particular day will align with one of the radial file slots or compartments carrying the index or control card for an animal, and then each of the animals represented by cards in this particular compartment will be treated in accordance with the program for that day. The program ring has a key or reference position which serves as the index position for alignment with the day of the month on the day-month ring.

Color coded cards for different groups of animals may be used and also therefore the program information can also be color coded for that particular group of animals. When a program item aligns with a file slot or compartment containing cards of more than one group of animals, the coding is used to determine which group is to receive that particular program. Indicia also can be provided for determining when the treatment or care item on the program for a particular group is done, merely by the use of small coded clips (hairpins) that are placed over the control card for the animal for which the item is performed until the particular program item is completed so that it is known at a glance if the work is completed. The clips can be coded to a progrm item as well.

The indicia provides quick visual reference to determine that the programmer has been advanced to the correct day of the month, and also, the indicia for indicating the month and the days of the month are adjustable so months of different length can easily be accommodated without disrupting the program.

The device is relatively low cost to maintain. Because the center portions of the programmer do not rotate, but remain stationary, suitable compartments can be provided in the center of the housing for storing the cards of animals that are not entered in the program, or which may be taken out of the program for one reason or another. Also, because the file slots are stationary, the slots can be numbered and a cross reference sheet can be used to determine which slot contains the card for a particular animal.

The programmer provides structure for setting up control of production in a direct, money saving, and efficient manner.

BRIEF DESCRIPTION OF THE DRAWINGS

FIG. 7 is a top plan view of a typical program for a 144 day cycle of animals; and FIG. 8 is a edge view of a file slot with animal control cards therein.

DESCRIPTION OF THE PREFERRED EMBODIMENT

Figure 1:
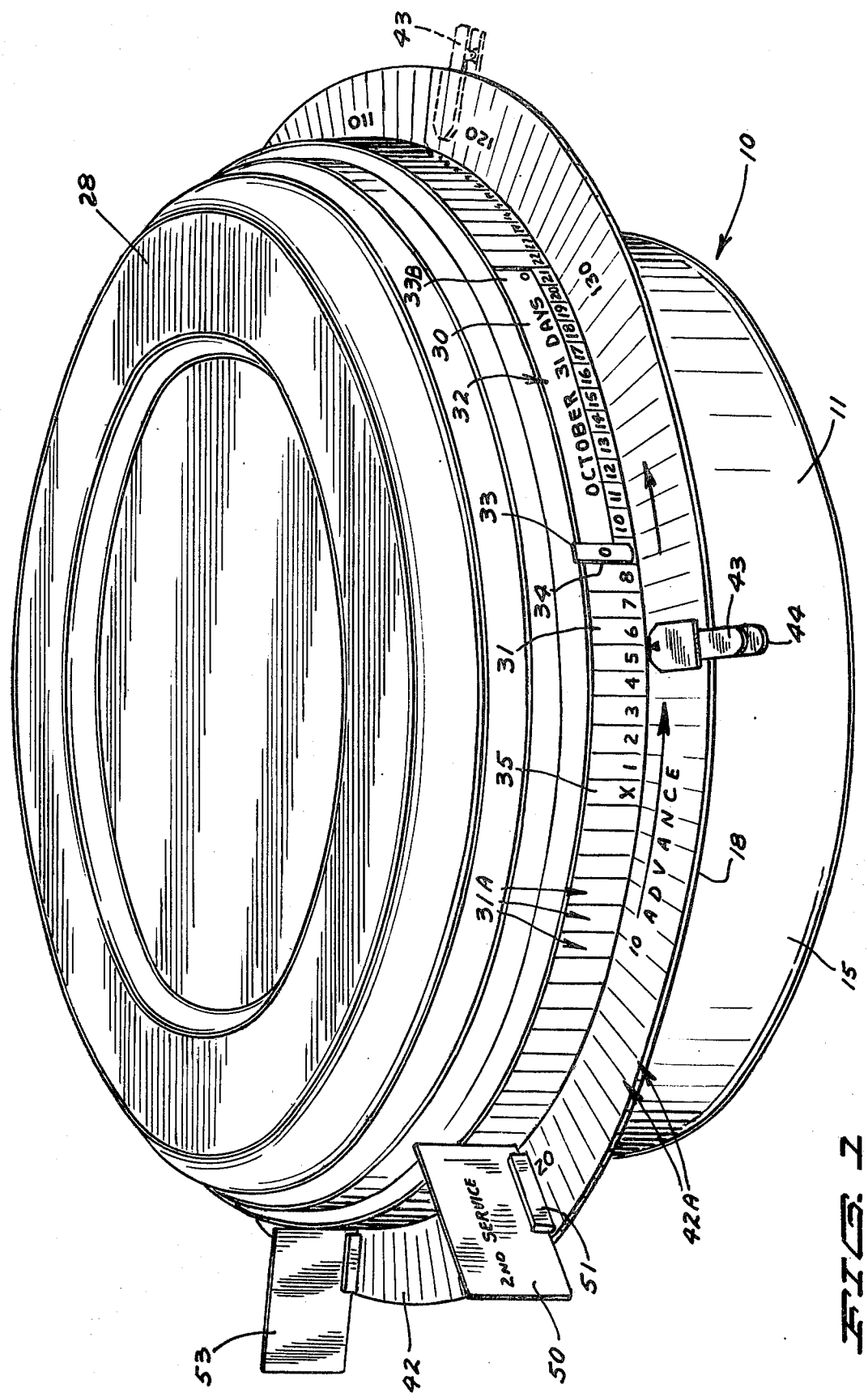
FIG. 1 is a perspective view of a programmer made according to the present invention with a cover installed over the center portions of the programmer.
Figure 2:
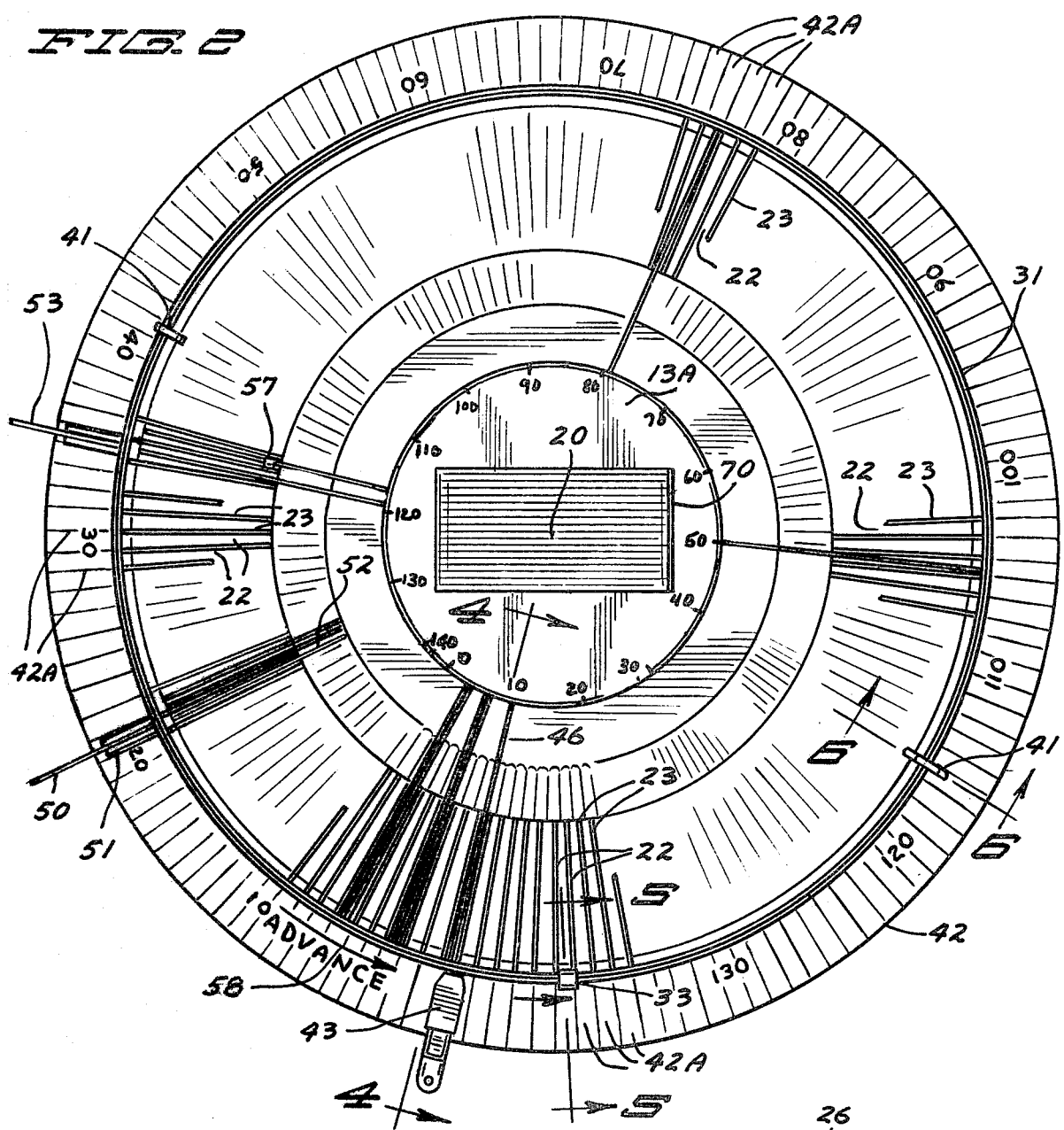
FIG. 2 is a top plan view of the device of FIG. 1 with parts broken away for sake of clarity, and with the cover removed from the programmer device.

The programmer indicated generally at 10 in FIG. 1 includes a outer housing or support 11, which as shown has a center chamber indicated generally at 12 (see FIG. 2). The housing 11 has a base or bottom wall 13, as perhaps can be best seen in FIG. 4. The base wall has a raised center section 13A which is supported on a vertical wall portion 13B. The outer annular base wall portion 13C as shown is the main support and rests on a supporting surface.

A cylindrical upright peripheral wall 15 is attached to the support wall 13 at the outer edge of wall portion 13A and extends vertically upwardly. An annular lip or flange 16 is attached to the upper edge of wall 15 and it extends generally horizontally and completely surrounds the main housing 11. A support ring or cylindrical wall section indicated generally at 17 extends above the wall 15 and is fixed thereto. This wall section 17 has a flange 18 extending horizontally, and flange 18 is mounted above and is attached to the flange 16. The flange 18 as shown extends outwardly beyond the end of the flange 16.

Figure 4:
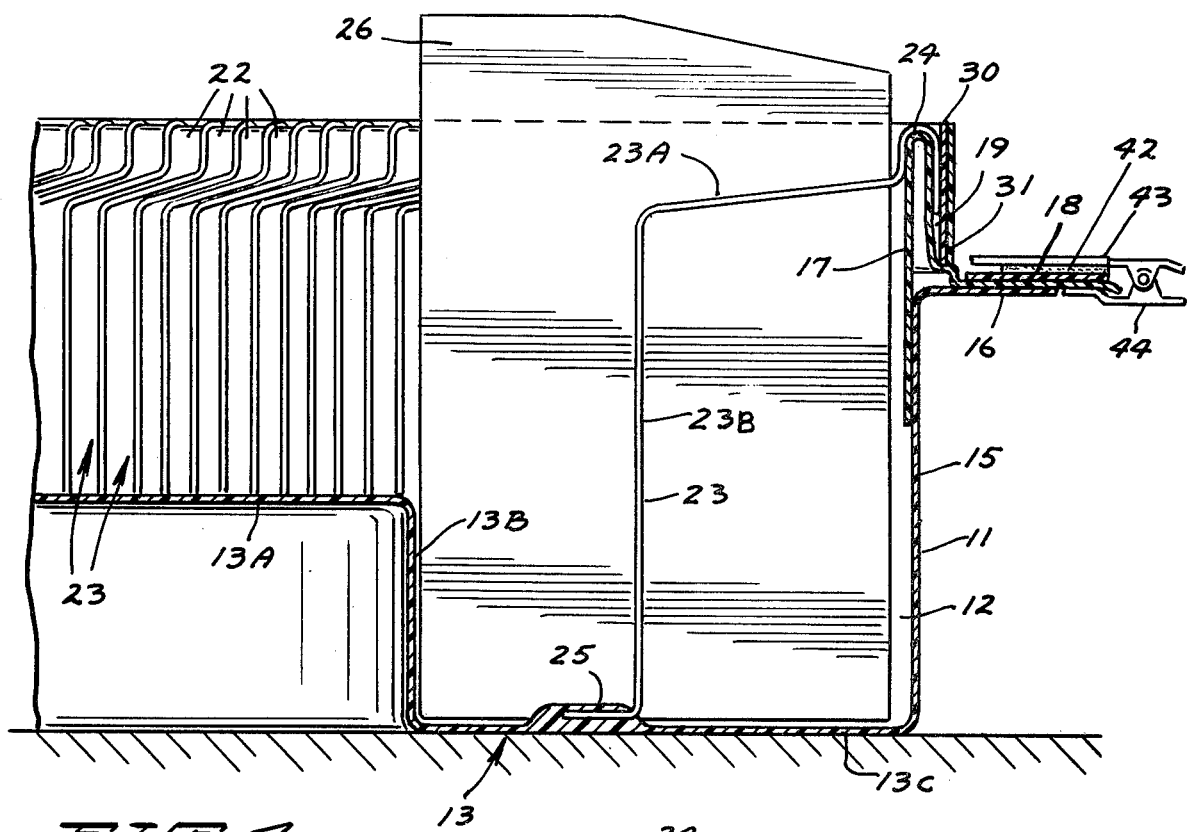
FIG. 4 is a sectional view taken as on line 4—4 in FIG. 2.

The outer surface of the wall 17, which is shown at 19 in FIG. 4, forms a generally cylindrical surface that is concentric with the central axis of the housing which is indicated at 20 in FIG. 2.

In the interior recess 12 of the housing there are a plurality of radially extending filing slots or bins 22 formed with separating wires indicated at 23. The wires 23 are spaced apart and extend radially as shown. One end of each of the wires 23 is attached as at 24 to the upper edges of the cylindrical wall 17, at the outer edge of the housing 11. The outer ends of the slots thus are equal distances from the axis 20.

The wires each include a horizontally extending leg 23A, and a vertically extending leg 23B which fastens as at 25 to the wall section 13C. It should be noted that the wires 23 terminate short of the wall 13B, but define radially extending filing slots 22 from the outer wall of the housing extending inwardly toward the housing central axis 20.

In the specific programmer shown, there are one hundred forty four such slots 22 (to correspond to a one hundred forty four day production cycle) and each of the slots 22 can be numbered as shown in numerals adjacent the peripheral edge of the wall 13A, and on the upper surface thereof. These numerals are indicated in FIG. 2, and while only certain of the numerals are provided, each of the slots can be numbered.

The slots 22 are of size to hold a plurality of flat animal control file cards indicated generally at 26. The control cards 26 are of size and shape to conform to the outer cover which is shown at 28 in FIG. 1, but which is removed in the rest of the figures. The control cards 26 are each made so that they will contain the information that is necessary for full control of the care and treatment of the animal and for a record of production for several gestation periods.

The animals are generally identified by a number carried on an ear tag and this number would be entered on the control card for that animal for identification.

In hog production, the sow would be subjected to certain items of treatment during a production cycle of 144 days (which cycle can be selected to fit existing circumstances) and each sow would have a number of different litters in its life. Thus one side of the card 26 for that sow would contain blanks in which the information for each litter should be separated out, and would include information for the sow such as the date it was bred, the boar number used, the date when the litter would be due, the farrowing date, the number of pigs in the litter, and the number of pigs that were weaned toward the end of the sow's production cycle. Information also could be used for subjectively rating the sow's production.

The opposite side of the card could include blanks to check off each item of treatment or performance from the program for each of the litters, such as when the sow was wormed for the first and second times and the card could provide blanks for dates of each other treatment or item of care as well. Each item in the production program could be arranged in a horizontal line, with a separate line provided for each of several litters, in a table type form selected by the producer to provide the necessary information.

Additionally, the animal control cards 26 could be made in different colors or indicia to code particular animals into a particular group of animals. For example perhaps one group of sows would be subjected to a different ration during the time of pregnancy from another group of sows and each sow in each group would thus be identified by particular indicia on its control card. Likewise, perhaps a group of sows would be provided with particular medications at a different time in the cycle and the group which is to be supplied with such different items of treatment or performance can be identified by other indicia on the card. For example blue, green, red and white cards can be used for four different control groups.

It should be noted that the housing 11 therefore provides the base frame for a programmer, and the individual wires 23 forming the individual slots indicated at 22 in FIG. 2 for example, remain stationary with respect to the housing 11 during operation. This means that the numerals indicated on the top of center panel 13A do not move relative to the slots 22. Thus once an animal control card 26 is inserted in a particular slot 22 it will stay in that position throughout the animal's cycle. A separate tabulation can then be kept for each of the animals (identified by number) as to which slot that animal's card is in for a cross reference.

Figure 5:
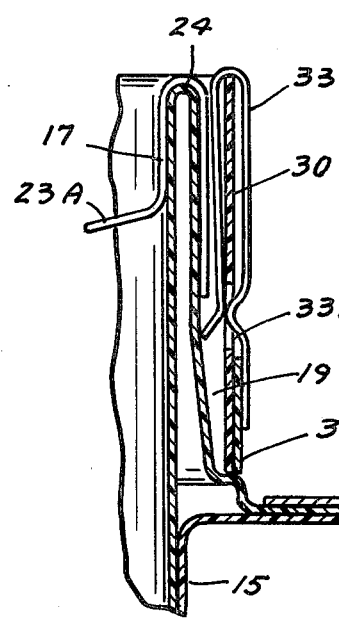
FIG. 5 is a fragmentary sectional view taken as on line 5—5 in FIG. 2.
Figure 6:
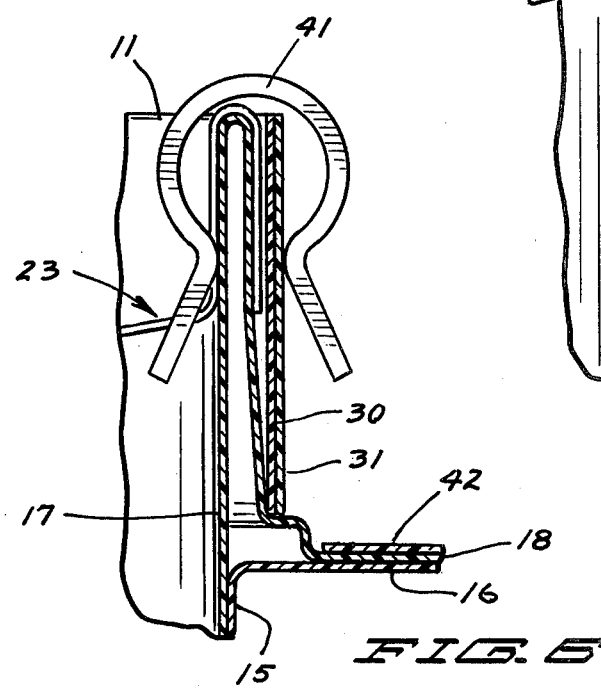
FIG. 6 is a sectional view taken as on line 6—6 in FIG. 2.

An annular cylindrical band of suitable plastic material indicated generally at 30 is slidably mounted on the outside of the outer surface 19, which is shown in FIG. 4, and also in FIGS. 5 and 6. The band 30 as can be seen in FIG. 3 carries a legend spaced at appropriate intervals for each of the months of the year, and a written reminder as to how many days there are in each respective month.

Figure 3:
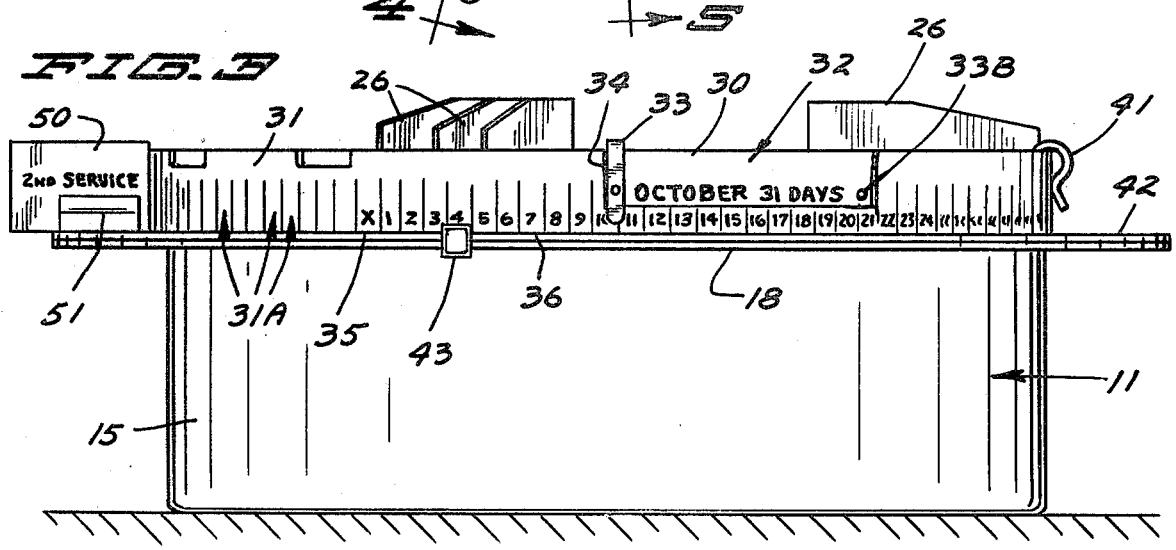
FIG. 3 is a side elevational view of the device of FIG. 2.

As shown in FIG. 3 October is the month that appears in the program cycle that will be under discussion, and this month and the number of days appears through a cutaway or recess 32 provided in an outer band 31 that surrounds the band 30. The cutaway portion 32 permits one month legend on band 30 to be visually observed at a time. The program operation is thus indicated in real time which is the current month and day. The bands 30 and 31 may be rotated relative to each other, and are releasably retained in position relative to each other with a suitable clip indicated at 33 which has a portion which passes through or nests in a provided punch opening 33A (see FIG. 5) in the band 30. The opening 33A is adjacent the start of the legend for October, as shown and a corresponding opening is adjacent the legend for each month. These clips 33 remain stationary throughout a month of time so that the two bands 30 and 31 are indexed relative to each other except when the clip 33 (or clips) is removed. The trailing edge of the recess 32 abuts against the clip 33 as indicated at 34 when in use to properly align the recess with the legend for a month.

The band 31 as shown has a number of individual arcuate segments shown generally at 31A marked thereon by vertical lines which are equal to the spacing of the slots 22 at the outer edge of the slots. The lines separating segments 31A are parallel to the plane of wires 23 and spaced equal to the wire spacing. Only a certain selected number of the arcuate segments 31A on the band 31 carry identifying marks. For example, the arcuate segments shown in FIG. 3 include an "X" segment or space 35 which is at the left of numerals indicating dates, which are indicated generally at 36. The numerals extend up through 31 days.

Thirty one is the highest number of days in any month, and it should be noted that for purposes of reminder as to the number of days in each month the last three dates on segments 31A, namely 29, 30 and 31, are separately identified by color to highlight the fact in certain months these dates will not be used. The shortest month is February which has 28 days. The different color is a visual reminder to change the month which is visible through aperture 32 when the end of each month approaches.

A pair of large resilient clips 41 are utilized for simultaneously releasably securing both of the bands 30 and 31 to wall 17 (against surface 19) to prevent both bands from shifting or rotating relative to the wall 17. Thus, once the lines separating segments 31A are aligned, clips 41 keep the bands and the segments defined thereon from rotating relative to the slots 37 during use.

When the month visible in aperture 32 is to be changed the clips 41 are removed, and the clip 33 is also removed as will be explained. It should be noted that two clips 33 may be used if desired.

The flange 18 has an upper surface which supports a flat ring 42 which is the programming ring for the animals. The programming ring is thus an annular band, which can be seen in top plan view in FIG. 2, and which has a fixed spring clip member 43 attached to the first day of the program. The clip 43 is permanently fixed to ring 42 at the first day segment to thereby provide an index or reference position for the first day of the program. The ring 42 is divided into a plurality of segments 42A which are of size to correspond to slots 22. There are 144 segments on ring 42 representing 144 days of program. The clip 43 has a spring loaded lower portion 44 (see FIG. 4) which clamps the ring 42 against the flange 18, and holds the ring in position when the clip is gripping the flange 18. Movement of the clip 43 when it is released from the flange 18 causes the entire programming ring 42 to rotate on the flange 18 and relative to the housing and file slots 22.

The clip 43 carries the reference legend for the start of a production cycle. In the case of production for hogs, the reference legend is "bred today" to indicate that a fixed cycle starts when a sow is bred. Thus specific individual control cards are indicated at 46 in FIG. 2 in the slot aligning with clip 43 to represent particular sows which are bred on the day indicated in the day segment on band 31 (October 4) also aligned with clip 43. On each succeeding day, or other selected time period, the clip 43 would be released from the flange 18, and the clip and attached program ring are advanced one day segment at a time to align with the particular date that is applicable.

For example in FIG. 3 it is being shown aligned with October 4, as stated, and on October 4 each item on the program would be carried out for the animals whose control cards are in the slots aligning with the particular program functions. The animals or subjects are to be subjected to the care or treatment that was programmed. Referring to FIGS. 2, 3 and also 7 for example, at the 21st day, the sows which had previously been bred would be subjected to a second service or a second breeding, and this would be indicated on a program card 50 which is mounted onto a suitable block 51 that is fixed adhesively or in some immovable way to the program ring 42 (see also FIGS. 2 and 3). Thus the animals whose cards would appear in slot number "133", the cards of which are indicated at 52 in FIG. 2 would be subjected to a second service. Then, on October 4, which is the day aligning with the clip 43, the animals, for example, sows, which have been bred 35 days earlier would be subjected to a pregnancy test as indicated by a program member 53 carried on the ring 42. This is also shown in FIG. 7 as part of the program. The cards of these animals are indicated generally at 54 and would be generally in slot number 119.

Thus each item in the program would be advanced one day at a time to align with the particular day of the month indicated on the ring 31 shown in FIG. 3. On October 5, the clip 43 would be moved to align with the October 5 segment and then the program items aligning with the particular slots 22 would be carried out for the animals whose cards are in those slots. The complete cycle of production may be arbitrary and selected by the operator, but should encompass the production cycle for the animal through the raising of a litter.

The direction of advance (counterclockwise) of the programming ring is shown by arrow 58. The program ring is advanced only one day at a time, and the clip 43 is used for advancing the ring to keep it in alignment with the correct date. It can be seen that by expanding the size of the housing and expanding the diameter of the programming ring, the number of slots and days in the program can be changed. Of course the number of file slots should correspond to the number of the days in the program cycle being utilized. Note that the numerals on the ring 42 represent the days or time periods from the "start" or reference position at clip 43.

In changing the month and day rings 30 and 31 to another month, for example at the end of October, the "bred today" or reference segment at clip 43 would be aligned with October 31, the last day of that month. This position is shown in dotted lines in FIG. 1. The clip 43 is left in place while the month and day rings are advanced. The large clips 41 are released or removed, and clip 33 is removed from its position shown in solid lines, and the clip 33 would then be placed in the opening 33B adjacent the end of the phrase "October 31 days". Then the ring 31 is moved relative to ring 30 until the abutting line 34 is stopped against the clip 33 (placed in hole 33B), and this movement caused a legend "November-30 days" (the legend for the next month) to be visible through the aperture 32. The ring 30 contains a similar legend for each month spaced at appropriate intervals. A hole corresponding to hole 33A for clip 32 is also provided adjacent each such month legend to permit indexing the day ring 31. Then the rings 30 and 31 are both rotated counterclockwise until the "X" indicia in segment 35 is aligned with the clip 43. The clip 43 is in position shown in dotted lines in FIG. 1 for the 31 day month (October as shown). Then once the "X" indicia and the clip 43 are aligned, the clips 41 are placed back into position to hold the rings 30 and 31 from moving and the program ring can be advanced to the "1" segment, for November 1, and the unit is utilized for the month of November in exactly the same way as described. The clip 43 is advanced one segment for each additional day or other selected time period.

If the month shown in aperture 32 has only 30 days, such as November, then the adjustment of the rings 30 and 31 would take place when the clip 43 was aligning with the day segment representing the 30th. The change of the rings 30 and 31 automatically compensates for months that have different days and provide for the same program regardless of the variation in length of the months. The program ring remains properly oriented for the slots while the month and day rings are adjusted.

The program shown in FIG. 7 is shown only for purposes of illustration. The ring 42 is divided into 144 days with the clip 43 at day "zero" or reference. Going clockwise from the clip 43 in FIG. 7 (the ring is moved counterclockwise in operation), which is the "bred today" location for hogs, the position of the second service flag indicated at 50 has been explained as has the pregnancy test 53. Other items could be programmed in, such as a change of feed ration for the sows in any one of the days of the cycle. Medication would be indicated at about 65 days for preventing worms, and this program flag is indicated at 60. Other vacinations could occur at approximately 77 days after start as indicated at 61; spraying for mange and lice could occur at 86 days as shown at 62, and a second spraying could be applied in approximately 93 days as shown at 63.

Similar provisions for items of care or treatment of the subjects throughout the normal production cycle could be made on the programming device through the use of small cards carrying the item on their face. These cards and blocks are shown in FIGS. 2 and 3. The blocks indicated generally at 51 contain slots for the card, for example cards 50 and 53, and the bottom of the blocks 51 have adhesive material that causes them to adhere to the programming ring 42.

At the time shortly before farrowing, as indicated at 68 in FIG. 7, the hogs can be moved into crates, and at this time the record of the sow can be maintained as to what crate the sow might be in, so that a separate tabulation of each sow is kept. However, the file or control cards would remain in the slots for the program because the rest of the program would continue until the little pigs are weaned, and the sows are vacinated, as shown at 69. Shortly thereafter the same sow would then be bred again.

Once the pigs are weaned, however, the sow's card would be removed from its particular slot 27 and kept in a storage file box indicated at 70 in the center part of the carousel until the sow was bred again at which time the card would be placed in the slot aligning with the clip 43 for a repeat of the production cycle for that animal.

Also if a sow fails to pass the pregnancy test the card for that sow will be stored in box 70 until the sow is bred again. Thus the box 70 provides a convenient storage place for cards of animals not in the active program and the number of cards in the box 70 shows quickly the nonproducers in a herd.

There are certain tasks in caring for any animals which would not be completed for all of the animals in a particular slot during a single day. In order to keep track of the completion of tasks, a very simple reminder system or indicator system can be utilized using hairpins which have plastic colored ends that are highly visible on the pin. Such a pin is shown at 57 in FIG. 2 and in FIG. 8 as well. The pin has a plastic covering at the top or bend end that is of a particular color, and for example if the work for the sow or animals whose cards are in slot 118 was not completed the same day the slot 118 was aligned with the card 53 (pregnancy tests) in that particular day, a hairpin 57 can be placed over the last card in the slot for which the work was performed (working in counterclockwise direction) and it will be known then that this is the last animal for which the test has been performed.

Even if the program is advanced two or three slots, it will be known that the test indicated on card 53 will not have been performed on any of the animals between the hairpin 57 and the slot aligned with the card 53. The program card can be colored to correspond to the hairpin color also to clearly show what work is in progress. The indicators give a person a day or two to catch up on the tests or other treatment that is necessary for the animal without losing track of the progress. Also it provides a quick visual reference to determine what work is left to be done.

The color indicia on the hairpins 57 (see FIG. 8) is at the top or bend of the hairpin, and is readily visible from the top of the housing when the cover is removed. Different colors can be utilized for indicating different jobs as selected by the operator of the program.

Thus the device provides for convenient storage and record keeping, prompt and complete programming of care and treatment, and low cost of doing so. The ability to have the month and day indicated in real time in relation to advancement of the program provides for precise control without the problem of forgetting whether the program has been advanced one day or not. The stationary mounting of the control cards and filing slots for the control cards simplifies the operation and makes sure that the movement of the slots relative to the program does not occur accidentally.

What is claimed is:

1. A programming device for control of a program of treatment or operation relative to individual subjects represented on control cards and on which a plurality of programmed operations are to be performed comprising a housing, stationary means on said housing defining a plurality of slots for receiving control cards, each card representing one of the subjects, said slots being generally oriented in a radial direction from the central portions of the housing and having a width in annular direction, a rotationally movable annular program member having a plurality of program segments, at least some of said program segments representing a program operation and one of said segments being a reference segment, means on the housing for supporting said annular program member in position with each program segment associated with one of the slots in each position of the program member as the program member is moved relative to the housing, the program segments on the program member having an annular width substantially equal to the annular width of portions of said slots adjacent said program member, means to releasably secure said movable program member with respect to said housing, and means releasably secured relative to said program member and said housing for indicating the month and day during which the program is operated, said means indicating month and day including a day segment for each of said days corresponding generally in annular width to the segments of the program member and being positioned adjacent said program member whereby when the program member reference segment is advanced relative to the housing a distance equal to a day segment the program member advances a distance substantially equal to the width of adjacent portions of one of said slots, and each program segment advances to the next slot to indicate the programmed operation to be performed that particular day on the subjects whose cards are in the slot aligned with that program segment.

2. The combination as specified in claim 1 wherein said program member includes movable block means attachable to segments of said program member, each block means being adapted to carry information relative to a program item thereon.

3. The combination as specified in claim 1 wherein said program member is movably mounted radially outwardly from said means defining said slots.

4. The combination as specified in claim 3 wherein said means indicating month and day comprises separate rotatable band means mounted on said housing adjacent said program member, and means to releasably secure said rotatable band means carrying said month and day information relative to said housing and said program member.

5. A programming device for control of a program of treatment or operation relative to items represented on control cards comprising a housing having a central axis, means on said housing defining a plurality of slots for receiving control cards, said slots being generally oriented in a radial direction from the central portions of the housing and having a width in annular direction, a movable annular program member having a plurality of program segments, means on the housing for movably supporting said annular program member radially outwardly from said means defining said slots in position with each program segment associated with one of the slots in each selected position of the program member as the program member is moved relative to the housing, the segments on the program member having an annular width substantially equal to the width of portions of said slots, means to releasably secure said movable program member with respect to said housing, adjustable means movable relative to said program member and said housing for indicating the month and day during which the program is operated, said means indicating month and day including a day segment for each of said days corresponding generally in annular width to the segments of the program member whereby when the program member is advanced relative to the housing a distance equal to a day segment the program member advances a distance substantially equal to the width of adjacent portions of one of said slots, said means indicating said month and day comprising an inner generally cylindrical band and an outer generally cylindrical band, each rotatably mounted about said central axis of said housing adjacent outer ends of said slots, said bands having surfaces extending generally parallel to said axis, said inner band carrying written representations of the months of a year, and said outer band having an aperture therein through which one of the representations of a month is visible, said outer band having means forming segments representing individual days to carry out the program to such daytime interval.

6. The combination as specified in claim 5 wherein said program member comprises an annular program band rotatably mounted on said housing about the central axis of said housing, said annular program band having a surface generally perpendicular to said central axis, and said segments on said annular program band being defined by radially extending lines on a surface of said band.

7. The combination as specified in claim 6 wherein said housing includes a generally planar surface extending generally at right angles to the central axis of said housing, said planar surface supporting said annular program band for movement relative thereto.

8. The combination as specified in claim 6 wherein said annular program band is rotatably mounted relative to said housing adjacent outer ends of said slots and radially outwardly therefrom.

9. A programming device for programming the care and treatment of individual subjects through a predetermined sequence of events which occur in a known time period including a housing, said housing having a generally central axis, means on the housing for defining a plurality of radially extending slots extending from said central axis, said slots being of size to receive cards representing the subjects to be included in the program, a program member comprising an annular program band positioned adjacent said slots, said program band having a plurality of segments substantially corresponding in number to the number of slots defined on said housing, means on said housing to support said program band for rotational movement relative to said slots whereby the individual segments on said program band can be aligned with the slots, means to releasably retain said program band relative to said means to support, said program band including a reference position, and each of said segments on said program band being adapted to include a program item thereon, whereby said program band may be moved relative to said means to support, the individual segments on said program band thereby aligning sequentially with each of the slots as the program band is moved, and means adjacent said program band representing month and daytime intervals comprising a pair of overlying annular bands, the day band being to the exterior of said month band and having a slot through which one month representation is visible, means to releasably retain said month and day bands relative to each other and relative to said housing, said daytime intervals being represented by segments on said day band substantially corresponding in width to the segments on said program band, said month and day bands and said program band being movably mounted on said housing adjacent each other whereby said reference position on said program band may be aligned with a desired segment representing a daytime interval to carry out the program of such daytime interval.

* * * * *